US012639843B2

(12) United States Patent
You

(10) Patent No.: US 12,639,843 B2
(45) Date of Patent: May 26, 2026

(54) METHOD AND APPARATUS FOR DETERMINING POSE OF TRACKED OBJECT IN IMAGE TRACKING PROCESS

(71) Applicant: MATRIXED REALITY TECHNOLOGY CO., LTD., Wuxi (CN)

(72) Inventor: Zhenxing You, Beijing (CN)

(73) Assignee: MATRIXED REALITY TECHNOLOGY CO., LTD., Wuxi (CN)

( * ) Notice: Subject to any disclaimer, the term of this patent is extended or adjusted under 35 U.S.C. 154(b) by 387 days.

(21) Appl. No.: 18/252,881

(22) PCT Filed: Nov. 16, 2021

(86) PCT No.: PCT/CN2021/130885
§ 371 (c)(1),
(2) Date: May 14, 2023

(87) PCT Pub. No.: WO2022/105745
PCT Pub. Date: May 27, 2022

(65) Prior Publication Data
US 2024/0029295 A1      Jan. 25, 2024

(30) Foreign Application Priority Data
Nov. 17, 2020      (CN) .......................... 202011284180.2

(51) Int. Cl.
*G06T 7/73* (2017.01)
*G06T 7/246* (2017.01)
(Continued)

(52) U.S. Cl.
CPC ................ *G06T 7/73* (2017.01); *G06T 7/246* (2017.01); *G06T 7/579* (2017.01); *G06V 10/44* (2022.01); *G06V 10/751* (2022.01)

(58) Field of Classification Search
CPC .......... G06T 7/73; G06T 7/346; G06T 7/579; G06T 2207/10016; G06T 2207/10028; G06V 10/44; G06V 10/751
See application file for complete search history.

(56) References Cited

U.S. PATENT DOCUMENTS

2012/0114175 A1* 5/2012 Hwang ................ G06V 20/647
                                                                  382/103
2017/0161546 A1* 6/2017 Cansizoglu .......... H04N 13/204
(Continued)

FOREIGN PATENT DOCUMENTS

CN      106780601 A      5/2017
CN      111127556 A      5/2020
(Continued)

OTHER PUBLICATIONS

European Search Report received in Application No. 21893892.6; mailed Mar. 12, 2024.
(Continued)

*Primary Examiner* — Delomia L Gilliard
(74) *Attorney, Agent, or Firm* — K&L Gates LLP

(57) ABSTRACT

The present disclosure provides a method and apparatus for determining a pose of a tracked object in an image tracking process. In this method, a current frame of image and first point cloud information corresponding to the current frame of image are acquired, the first point cloud information being based on a relative relationship between an image capture device and an ambient space: and a pose of the tracked object in the current frame of image relative to the image capture device is determined according to the first point cloud information and object feature information of the tracked object if the tracked object is in a static state, the object feature information being based on a relative relationship between the tracked object and the ambient space. In this method, by using the first point cloud information to (Continued)

400

Acquire a current frame of image and corresponding first point cloud information
410

Is the tracked object in a static state?      No
420

Yes

Determine the pose according to extracted feature information and the object feature information
430

Determine a pose according to the first point cloud information and object feature information
440 convert the relative relationship of the tracked object, it facilitates determining the pose of the tracked object.

16 Claims, 4 Drawing Sheets

(51) Int. Cl.
*G06T 7/579* (2017.01)
*G06V 10/44* (2022.01)
*G06V 10/75* (2022.01)

(56) References Cited

U.S. PATENT DOCUMENTS

| | | | | |
|---|---|---|---|---|
| 2018/0075649 | A1* | 3/2018 | Godwin | ................. B64U 20/80 |
| 2019/0026922 | A1* | 1/2019 | Kellogg | ................. G06T 7/246 |
| 2019/0244050 | A1* | 8/2019 | Lin | ........................ G06V 10/17 |
| 2020/0074678 | A1* | 3/2020 | Ning | ....................... G06V 20/42 |
| 2021/0142492 | A1* | 5/2021 | Ahmed | ..................... G06T 7/73 |
| 2023/0316608 | A1* | 10/2023 | Lv | ........................... G06T 11/60 |
| | | | | 345/591 |

FOREIGN PATENT DOCUMENTS

| | | | | |
|---|---|---|---|---|
| CN | 111833403 A | 10/2020 | | |
| CN | 112396654 A | 2/2021 | | |
| WO | WO-2020135446 A1 * | 7/2020 | .......... G06V 20/653 | |

OTHER PUBLICATIONS

International Search Report received in the corresponding International Application PCT/CN2021/130885, mailed Feb. 9, 2022.

* cited by examiner

Point cloud acquisition unit
710

Pose determination unit
720

Pose determination apparatus700

Electronic device
800

Processor
810

Bus 850

Communication interface
840

Memory
830

Storage
820

METHOD AND APPARATUS FOR DETERMINING POSE OF TRACKED OBJECT IN IMAGE TRACKING PROCESS

CROSS-REFERENCE TO RELATED PATENT APPLICATIONS

This patent application is a national phase entry under 35 USC § 371 of International Application PCT/CN2021/130885, filed on Nov. 16, 2021, which claims the benefit of and priority to Chinese Patent Application No. 202011284180.2, filed on Nov. 17, 2020. The disclosures of the aforementioned applications are hereby incorporated by reference in their entireties.

TECHNICAL FIELD

The present disclosure relates to the field of image processing technology, specifically, to a method and apparatus for determining a pose of a tracked object in an image tracking process.

BACKGROUND

In image tracking technology, an object captured by a camera is located by means of image identification, infrared, ultrasonic or other method. Image tracking technology is widely used in the field of computer vision, for example, Virtual Reality (VR), Augmented Reality (AR), etc.

Currently, image tracking technology is combined with deep learning to implement image tracking, in which online learning and neural network models are mainly used. Whichever of online learning and neural network models is used, it is trained before being applied to image tracking. In an image tracking process, each frame of image acquired is input to a trained online learning model or neural network model, and then the online learning model or neural network model outputs pose information of tracked objects.

However, there are currently some problems in image tracking using deep learning. For example, a deep learning model applied to image tracking needs to be trained, and model training requires a large number of training samples. It is currently difficult to provide a large number of training samples, especially for an online learning model. In addition, for a neural network model, position information, which is a main component in pose information, output from the last layer is lost due to a convolutional pooling effect. In view of this, how to determine a pose of a tracked object without using deep learning, in image tracking, is a problem to be solved.

SUMMARY

In view of the foregoing, the present disclosure provides a method and apparatus for determining a pose of a tracked object in an image tracking process. In a pose determination solution provided in the present disclosure, first point cloud information is based on a relative relationship between an image capture device and an ambient space, and object feature information of a tracked object is based on a relative relationship between the tracked object and the ambient space. The first point cloud information of a current frame of image is used to convert the relative relationship between the tracked object and the ambient space characterized by the object feature information into a relative relationship between the tracked object and the image capture device, thereby determining a pose of the tracked object. By using the first point cloud information to convert the relative relationship of the tracked object, it facilitates determining the pose of the tracked object.

According to an aspect of the present disclosure, a method for determining a pose of a tracked object in an image tracking process is provided, including: acquiring a current frame of image and first point cloud information corresponding to the current frame of image, wherein the first point cloud information is based on a relative relationship between an image capture device and an ambient space; and determining a pose of the tracked object in the current frame of image relative to the image capture device, according to the first point cloud information and object feature information of the tracked object, if the tracked object is in a static state, wherein the object feature information is based on a relative relationship between the tracked object and the ambient space.

Optionally, in an example of the above aspect, the method further includes: determining a state of the tracked object according to the first point cloud information, the object feature information of the tracked object and point cloud information of the previous frame of image, the state including a static state and a dynamic state.

Optionally, in an example of the above aspect, determining a state of the tracked object according to the first point cloud information, the object feature information of the tracked object and point cloud information of the previous frame of image includes: determining a first matched feature point set of the tracked object in the current frame of image according to the first point cloud information and the object feature information of the tracked object; and determining the state of the tracked object according to the first matched feature point set and a second matched feature point set of the previous frame of image, wherein the second matched feature point set includes second matched feature point pairs obtained according to the point cloud information of the previous frame of image and the object feature information; and determining a pose of the tracked object in the current frame of image relative to the image capture device, according to the first point cloud information and the object feature information, if the tracked object is in a static state includes: determining the pose of the tracked object in the current frame of image relative to the image capture device, using the first matched feature point set, if the tracked object is in the static state.

Optionally, in an example of the above aspect, the method further includes: determining the number of matched point pairs in the first matched feature point set, or determining the number of matched point pairs between feature information extracted from the current frame of image and the object feature information, if a tracked object list does not include the tracked object, wherein the tracked object list is used to record tracked objects to be tracked in the image tracking process; and determining the state of the tracked object according to the determined matched point pairs if the determined number is greater than a number threshold; and determining the state of the tracked object according to the first matched feature point set and a second matched feature point set of the previous frame of image includes: determining the state of the tracked object according to the first matched feature point set and the second matched feature point set of the previous frame of image if the tracked object list includes the tracked object.

Optionally, in an example of the above aspect, the second matched feature point set of the previous frame of image is determined based on the fact that the tracked object in the previous frame of image is in a static state.

Optionally, in an example of the above aspect, the first point cloud information is obtained based on the current frame of image and historical frames of images corresponding to the static state.

Optionally, in an example of the above aspect, the method further includes: performing feature extraction on the current frame of image if a specified condition is met; matching extracted feature information with the object feature information to obtain matched point pairs for the tracked object; and determining the pose of the tracked object in the current frame of image relative to the image capture device according to the obtained matched point pairs.

Optionally, in an example of the above aspect, determining the pose of the tracked object in the current frame of image relative to the image capture device according to the obtained matched point pairs includes: if the number of the obtained matched point pairs is greater than a specified threshold, determining the pose of the tracked object in the current frame of image relative to the image capture device according to the obtained matched point pairs.

Optionally, in an example of the above aspect, the specified condition includes any one of the following conditions: the current frame of image is a first frame of image: there is no tracked object currently; pose determination using the first point cloud information fails; and the tracked object is in a dynamic state.

Optionally, in an example of the above aspect, matching extracted feature information with the object feature information to obtain matched point pairs for the tracked object includes: matching the extracted feature information with the object feature information, based on a pose of the tracked object in the previous frame of image, to obtain the matched point pairs for the tracked object.

Optionally, in an example of the above aspect, point cloud information of frames of images is extracted by using a SLAM algorithm.

According to another aspect of the present disclosure, an apparatus for determining a pose of a tracked object in an image tracking process is also provided, including: a point cloud acquisition unit configured to acquire a current frame of image and first point cloud information corresponding to the current frame of image, wherein the first point cloud information is based on a relative relationship between an image capture device and an ambient space; and a pose determination unit configured to determine a pose of the tracked object in the current frame of image relative to the image capture device, according to the first point cloud information and object feature information of the tracked object, if the tracked object is in a static state, wherein the object feature information is based on a relative relationship between the tracked object and the ambient space.

Optionally, in an example of the above aspect, the apparatus further includes: a state determination unit configured to determine a state of the tracked object according to the first point cloud information, the object feature information of the tracked object and point cloud information of the previous frame of image, the state including a static state and a dynamic state.

Optionally, in an example of the above aspect, the state determination unit is configured to: determine a first matched feature point set of the tracked object in the current frame of image according to the first point cloud information and the object feature information of the tracked object; and determine the state of the tracked object according to the first matched feature point set and a second matched feature point set of the previous frame of image, wherein the second matched feature point set includes second matched feature point pairs obtained according to the point cloud information of the previous frame of image and the object feature information; and the pose determination unit is configured to determine the pose of the tracked object in the current frame of image relative to the image capture device by using the first matched feature point set if the tracked object is in a static state.

Optionally, in an example of the above aspect, the apparatus further includes: a matched point pair determination unit configured to determine the number of matched point pairs in the first matched feature point set, or determine the number of matched point pairs between feature information extracted from the current frame of image and the object feature information, if a tracked object list does not include the tracked object, wherein the tracked object list is used to record tracked objects to be tracked in the image tracking process: and the state determination unit is further configured to: determine the state of the tracked object according to the determined matched point pairs if the determined number is greater than a number threshold; and determine the state of the tracked object according to the first matched feature point set and the second matched feature point set of the previous frame of image if the tracked object list includes the tracked object.

Optionally, in an example of the above aspect, the apparatus further includes: a feature extraction unit configured to perform feature extraction on the current frame of image if a specified condition is met; and a feature matching unit configured to match extracted feature information with the object feature information to obtain matched point pairs for the tracked object; and the pose determination unit is configured to determine the pose of the tracked object in the current frame of image relative to the image capture device according to the obtained matched point pairs.

Optionally, in an example of the above aspect, the pose determination unit is configured to: if the number of the obtained matched point pairs is greater than a specified threshold, determine the pose of the tracked object in the current frame of image relative to the image capture device according to the obtained matched point pairs.

Optionally, in an example of the above aspect, the feature matching unit is configured to match the extracted feature information with the object feature information, based on a pose of the tracked object in the previous frame of image, to obtain the matched point pairs for the tracked object.

According to another aspect of the present disclosure, an electronic device is also provided, including: at least one processor: and a memory storing instructions which, when executed by the at least one processor: cause the at least one processor to execute the method for determining a pose of a tracked object in an image tracking process as described above.

According to another aspect of the present disclosure, a machine-readable storage medium is also provided, which stores executable instructions which, when executed, cause a machine to execute the method for determining a pose of a tracked object in an image tracking process as described above.

BRIEF DESCRIPTION OF THE DRAWINGS

Further understanding of the essence and advantages of the present disclosure can be achieved by referring to the accompanying drawings below. In the accompanying drawings, similar components or features may have the same reference numerals.

DETAILED DESCRIPTION

Figure 1:
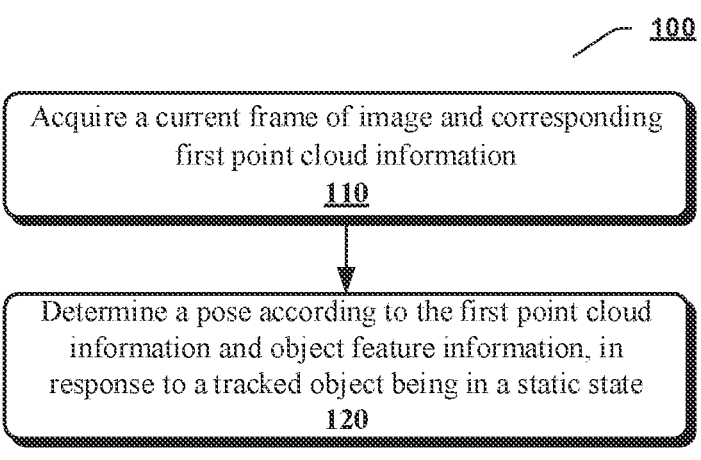
FIG. 1 shows a flow diagram of an example of a method for determining a pose of a tracked object in an image tracking process according to an embodiment of the present disclosure.

The subjects described herein will be discussed below with reference to exemplary implementations. It should be understood that these implementations are discussed just to enable those skilled in the art to better understand and implement the subjects described herein, and are not intended to limit the scope of protection, applicability or examples set forth in the claims. Functions and arrangements of elements discussed can be changed without departing from the scope of protection of the present disclosure. In the examples, various processes or components can be omitted, substituted or added, as needed. Furthermore, features described with respect to some examples can also be combined in other examples.

As used herein, the term "includes" and its variants denote open-ended terms, meaning "including but not limited to". The term "based on" means "at least partially based on". The terms "one embodiment" and "an embodiment" denote "at least one embodiment". The term "another embodiment" denotes "at least one other embodiment". The terms "first", "second" and the like may refer to different or same objects. Other definitions can be included below, whether explicitly or implicitly. The definition of a term is consistent through- out the description unless explicitly indicated in the context.

In image tracking technology, an object captured by a camera is located by means of image identification, infrared, ultrasonic or other method. Image tracking technology is widely applied in the field of computer vision, for example, virtual reality, reality augmentation, etc.

Currently, image tracking technology is combined with deep learning to implement image tracking, in which online learning and neural network models are mainly used. Whichever of online learning and neural network models is used, it is trained before being applied to image tracking. In an image tracking process, each frame of image acquired is input to a trained online learning model or neural network model, and then the online learning model or neural network model outputs pose information of tracked objects.

However, there are currently some problems in image tracking using deep learning. For example, a deep learning model applied to image tracking needs to be trained, and model training requires a large number of training samples. It is currently difficult to provide a large number of training samples, especially for an online learning model. In addi- tion, for a neural network model, position information, which is a main component in pose information, output from the last layer is lost due to a convolutional pooling effect. In view of this, how to determine a pose of a tracked object without using deep learning, in image tracking, is a problem to be solved.

In view of the foregoing, the present disclosure provides a method and apparatus for determining a pose of a tracked object in an image tracking process. In a pose determination solution provided in the present disclosure, first point cloud information is based on a relative relationship between an image capture device and an ambient space, and object feature information of a tracked object is based on a relative relationship between the tracked object and the ambient space. The first point cloud information of a current frame of image is used to convert the relative relationship between the tracked object characterized by the object feature infor- mation and the ambient space into a relative relationship between the tracked object and the image capture device, thereby determining a pose of the tracked object. By using the first point cloud information to convert the relative relationship of the tracked object, it facilitates determining the pose of the tracked object.

The method and apparatus for determining a pose of a tracked object in an image tracking process according to the present disclosure will be described in detail below in conjunction with the accompanying drawings.

FIG. 1 shows a flow diagram of an example 100 of a method for determining a pose of a tracked object in an image tracking process according to an embodiment of the present disclosure.

The method provided in the present disclosure can be applied to a device for performing image tracking opera- tions, for example, a virtual reality device, an augmented reality device, or the like. A device for executing the method of the present disclosure can acquire consecutive frames of images, for example, video to be displayed, images for a real scene captured in real time, or the like.

As shown in FIG. 1, at 110, a current frame of image and first point cloud information corresponding to the current frame of image can be acquired.

In the present disclosure, the first point cloud information can be based on a relative relationship between an image capture device and an ambient space. The image capture device can be a device that captures frames of images, and the image capture device transmits the captured frames of images to the device for executing the method of the present disclosure, or the image capture device can have the capa- bility to execute the method of the present disclosure. The ambient space can be characterized by a world coordinate system and the image capture device is in the ambient space. The first point cloud information can include point cloud information for a plurality of feature points in the current frame of image, and the point cloud information for each feature point can include three-dimensional coordinates of a corresponding projection of the feature point in the ambient space, and its pixel coordinates and descriptor in the current frame of image, and a unique identifier ID (pixel point ID) of a point cloud in space, etc.

Three-dimensional coordinates in the first point cloud information are three-dimensional coordinates in a first coordinate system with the image capture device as an origin. Three-dimensional coordinates corresponding to feature points extracted from an image are three-dimensional coordinates of projection points corresponding to feature points in a current frame of image projected into the ambient space.

Descriptors are used to describe local information of feature points at corresponding positions of an image, and the descriptors can be used to distinguish between the feature points. For example, if the distance between descriptors of two feature points is close in a vector space, it can be determined that the two feature points are similar or same.

In an example, the first point cloud information can be obtained by using a simultaneous localization and mapping (SLAM) algorithm. Accordingly, point cloud information of frames of images can also be obtained by using the SLAM algorithm. The present disclosure is illustrated with the first point cloud information as an example.

The plurality of feature points included in the first point cloud information can be all or part of pixel points in the current frame of image. In the case the plurality of feature points included in the first point cloud information are part of pixel points in the current frame of image, the part of the pixel points can be representative points in the current frame of image. The part of the feature points can remain unchanged when the viewing angle of the image capture device changes a small amount.

In the case the first point cloud information is only for part of the pixel points in the current frame of image, the amount of data for image processing for the current frame of image is reduced, and thus the corresponding first point cloud information can be extracted from the current frame of image more efficiently. In addition, a subsequent operation of determining the pose is also based on the first point cloud information, so the first point cloud information that includes only part of the pixel points results in a reduced amount of data for subsequent processing, thereby improving the efficiency of data processing for determining the pose.

In an example, the first point cloud information can be obtained by performing data processing on the current frame of image by a point cloud extraction device. The point cloud extraction device and the device for executing the method of the present disclosure (hereinafter referred to as an executing device) can be two different devices, and the point cloud extraction device is communicatively connected to the executing device. After acquiring the current frame of image, the executing device can send the current frame of image to the point cloud extraction device. The point cloud extraction device performs data processing on the current frame of image to obtain the first point cloud information, and feeds the first point cloud information back to the executing device, whereby the executing device can obtain the first point cloud information corresponding to the current frame of image.

For example, the executing device is an augmented reality device, and the point cloud extraction device is a cell phone, and the augmented reality device is communicatively connected to the cell phone. The augmented reality device is used to generate frames of images and send a generated current frame of image to the cell phone. The cell phone can perform data processing on the current frame of image to extract corresponding first point cloud information, and feed the first point cloud information to the augmented reality device.

In this example, the point cloud extraction device that extracts the first point cloud information and the executing device are two different devices, and the two devices can operate in parallel, which reduces the amount of data to be processed by the executing device and thereby reduces the load pressure on the executing device. In addition, the operations of frame of image acquisition and pose determination by the executing device and the operation of point cloud information extraction by the point cloud extraction device can be performed in parallel, thus improving the processing efficiency of image tracking.

In another example, the first point cloud information can be obtained by data processing on the current frame of image by the executing device. Specifically, the executing device acquires the current frame of image and processes the current frame of image to obtain the corresponding first point cloud information, and then can perform the operation for determining the pose of the tracked object of the present disclosure.

Then, at 120, the pose can be determined according to the first point cloud information and object feature information of the tracked object, if the tracked object is in a static state.

In the present description, the tracked object can be specified, and one or more tracked objects can be included in each frame of image.

An ambient space can be used as a reference for a tracked object in a static state. A tracked object being in a static state can mean that the tracked object remains motionless in the ambient space where it is located. For example, if there is a chair currently in the ambient space and the chair does not move without an external force, then it can be considered that the chair is in a static state. A state that a tracked object is static can be with respect to a time period. If a tracked object does not move in a period of time, it can be determined that the tracked object is in a static state in the time period. A tracked object being in a static state can be determined, for example, according to data detected by an inertial measurement unit (IMU) arranged in the tracked object.

In the present disclosure, object feature information of a tracked object can include a plurality of feature information data, and the plurality of feature information data can be combined to characterize the corresponding tracked object. Object feature information is based on a relative relationship between a tracked object and an ambient space, and object feature information of each tracked object can include pixel coordinates and descriptors in an image, for respective feature points of the tracked object. The ambient space is used as a reference for both the feature pixel coordinates and descriptors in the object feature information. The extraction of object feature information from an image can be implemented by freak feature extraction, orb feature extraction, or the like.

In the present disclosure, object feature information of a tracked object can be used as standard feature information of the tracked object. For example, if a set of feature information matches object feature information of a tracked object, then it can be determined that the set of feature information represents the tracked object.

In an example, object feature information of a tracked object can be pre-stored. Specifically, respective tracked objects can be predetermined, and after the respective tracked objects are determined, data processing, e.g. feature extraction, can be performed on an image including a determined tracked object to obtain object feature information for the tracked object, and then the obtained object feature information is stored in a preset offline feature database. The offline feature database is used to store object feature information of respective tracked objects, and object feature information in the offline feature database can be used as reference feature information for identifying a tracked object in an image tracking process.

In an example of the present disclosure, first point cloud information can be matched with object feature information of a tracked object to obtain matched point cloud information and object feature information. The matched point cloud information and object feature information are in one-to-one correspondence, for characterizing a same feature of the tracked object. For example, a tracked object is a table, and object feature information corresponding to a feature point on a corner of the table is matched with point cloud information.

Then, the matched point cloud information and object feature information are used for calculation by an Iterative Closest Point (ICP) calculation method to obtain a pose. In the ICP calculation method, a linear method (e.g., SVD) can be used for solution, and a nonlinear optimization method can also be used for solution.

In the present disclosure, a pose of a tracked object is based on a relative relationship between the tracked object and an image capture device. According to first point cloud information based on a relative relationship between the image capture device and an ambient space, and object feature information based on a relative relationship between the tracked object and the ambient space, the pose based on the relative relationship between the tracked object and the image capture device can be determined.

Figure 2:
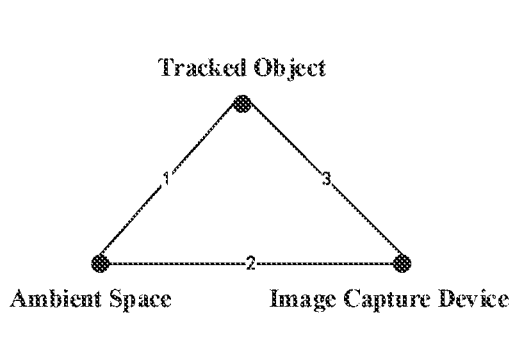
FIG. 2 shows a schematic diagram of an example of a relative relationship of an ambient space, an image capture device, and a tracked object according to the present disclosure.

FIG. 2 shows a schematic diagram of an example 200 of a relative relationship among an ambient space, an image capture device, and a tracked object in the present disclosure. As shown in FIG. 2, object feature information based on a relative relationship between the tracked object and the ambient space can be denoted as line 1, and first point cloud information based on a relative relationship between the image capture device and the ambient space can be denoted as line 2. Then line 3 can be obtained according to line 1 and line 2. Line 3 can characterize a relative relationship between the tracked object and the image capture device, whereby the obtained line 3 can denote a pose.

In the present disclosure, by introducing the first point cloud information based on the relative relationship between the image capture device and the ambient space, relative relationship conversion is performed on the object feature information of the tracked object to obtain the pose based on the relative relationship between the tracked object and the image capture device. This avoids the use of complex calculations for conversion to obtain a pose, thus simplifying a pose determination process and improving pose determination efficiency.

In an example of the present disclosure. the first point cloud information of the current frame of image can be obtained based on the current frame of image and historical frames of images corresponding to the same static state as the current frame of image.

When the tracked object is continuously in a static state, the static state in this case can be denoted as a static state. The tracked object continuously keeping a static state remains unchanged in the ambient space. When the tracked object starts moving, the current static state terminates.

Then, when the tracked object does not move any longer in the ambient space, the next static state for the tracked object starts.

The tracked object being in a static state means a continuous process without interruption. In this example, the historical frames of images corresponding to the static state are in the same static state as the current frame of image. For example, if the tracked object is static from 8 to 9 o'clock, and the tracked object starts moving at 9 o'clock. the current frame of image can be the last frame of image of the tracked object being static. In addition, if there are 300 historical frames of images before the last frame of image and in the time period from 8 to 9 o'clock, the 300 historical frames of images and the current frame of image are consecutive and are in the same static state.

In an example, the first point cloud information can be obtained based on the current frame of image and all historical frames of images corresponding to the static state. In another example, the first point cloud information can also be obtained based on the current frame of image and part of historical frames of images corresponding to the static state. In this example, the part of the historical frames of images can be randomly selected from all the historical frames of images, and can also be selected according to a specified rule. The specified rule can include selection of a specified number of frames at intervals, consecutive selection, or the like. For example, in the case part of the historical frames are selected according to a specified number of frames at intervals, every other frame of image can be selected from all the historical frames of images. In the case of consecutive selection, a specified number of historical frames of images that are consecutive from the current frame of image can be selected as part of the historical frames of images.

Figure 3:
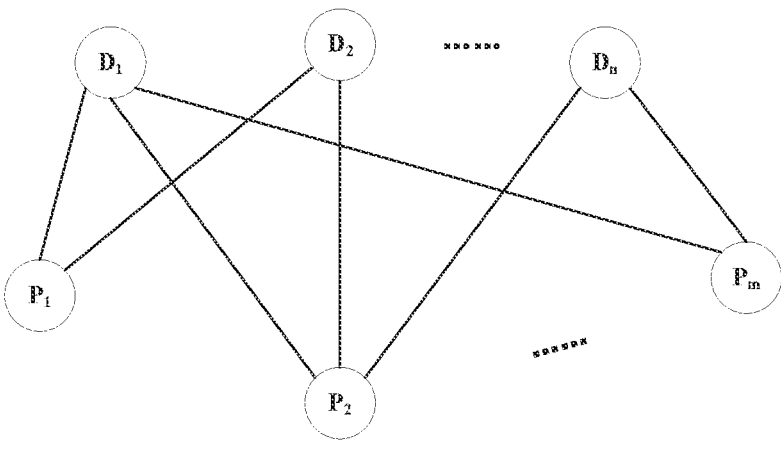
FIG. 3 shows a schematic diagram of an example of obtaining first point cloud information based on a plurality of frames of images according to the present disclosure.

FIG. 3 shows a schematic diagram of an example of obtaining first point cloud information based on a current frame of image and historical frames of images according to embodiments of the present disclosure. As shown in FIG. 3, $D_1, D_2, \ldots, D_n$ represent spatial points in an ambient space. $P_1, P_2, \ldots, P_m$ represent frames of images, wherein $P_m$ represents a current frame of image, and $P_1, P_2, \ldots, P_{m-1}$ represent historical frames of images. A line between D and P indicates that the spatial point D is in the frame of image P. For example, a line between $D_1$ and $P_1$ indicates that the spatial point $D_1$ is in the frame of image $P_1$.

Using a spatial point $D_i$ and a pixel point $U_i$ of a projection of the point in a frame of image $P_1$ as an example, if coordinates of the spatial point a are $[X_i, Y_i, Z_i]^T$, and coordinates of the pixel point $U_i$ of its projection are $[u_i, v_i]^T$, then a relationship between the spatial point $D_i$ and the pixel point $U_i$ can be expressed as:

$$s_i \begin{bmatrix} u_i \\ v_i \\ 1 \end{bmatrix} = KT \begin{bmatrix} X_i \\ Y_i \\ Z_i \\ 1 \end{bmatrix}.$$

The above equation is transformed into a matrix form: $s_i U_i = KTD_i$, where $s_i$ represents the depth of the spatial point $D_i$, K represents an intrinsic matrix of a camera, and a pose is denoted as a rotation parameter R and a translation parameter t, corresponding a Lie group T.

Noise of observed spatial points is included in the above equation, resulting in an error in this equation. A difference between a spatial point and its projected pixel point is calculated to represent this error, i.e., a reprojection error, which can be expressed as:

$$T^* = \operatorname{argmin} \frac{1}{2} \sum_{i=1}^{k} \left\| U_i - \frac{1}{s_i} KTD_i \right\|_2^2$$

where T* represents the reprojection error, k represents the total number of spatial points projected into frames of image, and each summation element represents an error of a pixel point obtained by projecting a spatial point into a frame of image. The above equation includes errors of each spatial point projected to respective frames of images, for example, errors of the spatial point $D_1$ projected to $P_1$, $P_2$, and $P_3$ in FIG. 3. In initial values of the above equation, there is a certain distance between the projected pixel point $U_i$ of the spatial point a and its actual projected point, and the distance is an existing error. This error can be reduced by adjusting a pose R and t of the camera. When the error is minimum, the projected pixel point obtained is more accurate, and the pose of the camera is more accurate. Of course, during the adjustment errors of projections of a plurality of spatial points on frames of images need to be considered comprehensively, for the ultimate purpose of a minimum overall error. In this example, the error adjustment is performed for a plurality of frames of images including a current frame of image and historical frames of images. That is, information of a plurality of frames of images is considered comprehensively to adjust the error to the minimum to obtain more precise three-dimensional coordinates of the spatial points and coordinates of the corresponding projected pixel points, thus improving the precision of the first point cloud information.

Minimization calculation for the above equation can be performed by a gradient descent method, a Gauss-Newton type method, a Newton type method, a Levenberg-Marquardt (LM) algorithm, or the like.

In the above example, first point cloud information of each frame of image is obtained based on the frame of image and historical frames of images. Such first point cloud information is obtained by combined superposition of image information of a tracked object including a tracked object in a static state, such that the precision of the first point cloud information is higher.

Figure 4:
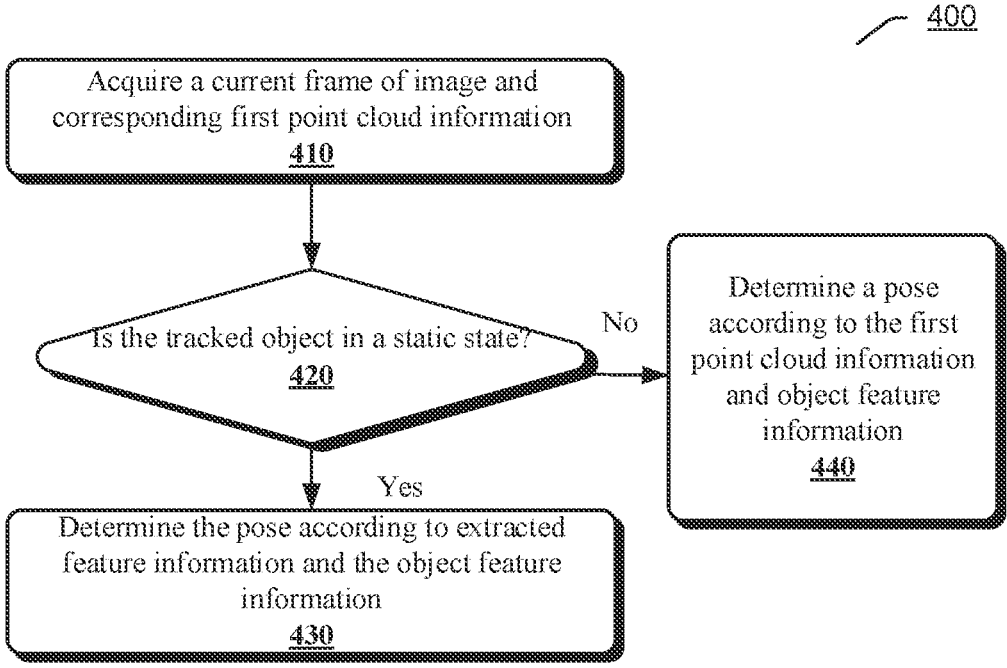
FIG. 4 shows a flow diagram of another example of a method for determining a pose of a tracked object in an image tracking process according to another embodiment of the present disclosure.

FIG. 4 shows a flow diagram of another example 400 of a method for determining a pose of a tracked object in an image tracking process according to an embodiment of the present disclosure.

As shown in FIG. 4, at 410, a current frame of image and first point cloud information corresponding to the current frame of image can be acquired. For the operation of 410. reference can be made to the above-described operation of 110 shown in FIG. 1.

Then, at 420, it can be determined whether the tracked object is in a static state according to the first point cloud information, object feature information of the tracked object, and point cloud information of a previous frame of image. In an example, a state of the tracked object can be determined. The state of the tracked object can include a static state and a dynamic state. When it is determined that the tracked object is in the static state, an operation of 430 is performed. When it is determined that the tracked object is in the dynamic state, an operation of 440 operation is performed.

In In an instance in which it is determined that the tracked object is in the static state, it can be determined that the first point cloud information of the current frame of image includes valid point clouds and includes a sufficient number of valid point clouds. Based on this, at 430, a pose of the tracked object in the current frame of image relative to an image capture device is determined according to the first point cloud information and the object feature information of the tracked object. For the operation of 430, reference can be made to the above-described operation of 120 shown in FIG. 1.

At 440, the pose can be determined according to extracted feature information and the object feature information.

Figures 5, 6:
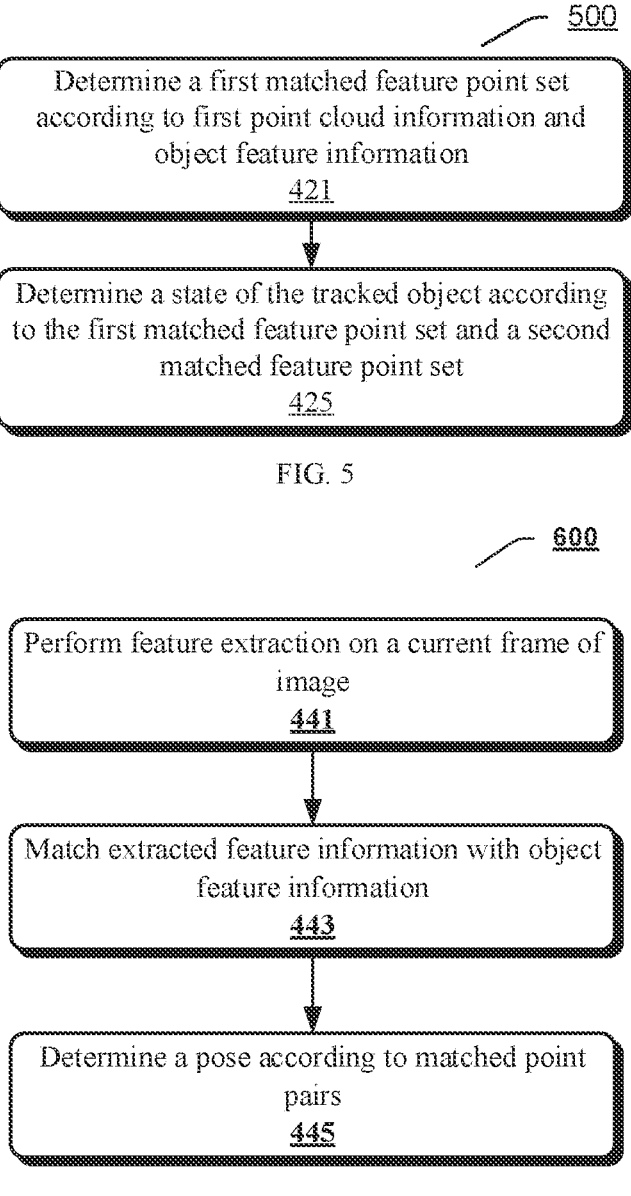
FIG. 5 shows a flow diagram of an example of a method for determining a state of a tracked object according to an embodiment of the present disclosure.
FIG. 6 shows a flow diagram of an example of a method for determining a pose according to extracted feature information and object feature information according to an embodiment of the present disclosure.

The operation of 420 described above is specifically illustrated below in conjunction with FIG. 5. FIG. 5 shows a flow diagram of an example 500 of a method for determining a state of a tracked object in an embodiment of the present disclosure.

As shown in FIG. 5, at 421, a first matched feature point set of the tracked object in a current frame of image can be determined according to first point cloud information and object feature information of the tracked object.

Specifically, the first point cloud information can be matched with the object feature information of the tracked object to obtain matched point cloud information and object feature information. Each matched pair of point cloud information and object feature information can form a matched point pair, and each matched point pair characterizes a feature point of the tracked object.

All matched point pairs obtained by matching the first point cloud information and the object feature information can form the first matched feature point set, and feature points characterized by all the matched point pairs in the first matched feature point set can be used to characterize the tracked object.

In an example, the first point cloud information can include pixel point IDs, and each matched point pair obtained from the first point cloud information and the object feature information is in one-to-one correspondence with a pixel point ID. Based on this, a set of pixel point IDs corresponding to the respective matched point pairs can be determined as the first matched feature point set.

Then, at 425, a state of the tracked object is determined according to the first matched feature point set and a second matched feature point set of the previous frame of image. The state of the tracked object can include a static state and a dynamic state. Both the static state and the dynamic state in the present disclosure are states relative to an ambient space.

The second matched feature point set can include second matched feature point pairs obtained according to point cloud information of the previous frame of image and the object feature information, and each second matched feature point pair includes matched point cloud information and object feature information. In an example, the second matched feature point pairs are in one-to-one correspondence with pixel point IDs in the point cloud information, and the second matched feature point set can include the pixel point IDs corresponding to the second matched feature point pairs.

In an example, the second matched feature point set of the previous frame of image can be determined based on the fact that the tracked object in the previous frame of image is in a static state. In this example, the tracked object in a consecutive plurality of frames of images prior to the previous frame of image may also be in a static state.

For an image tracking process of the previous frame of image, a pose of the tracked object in the frame of image immediately previous to the previous frame of image (i.e., the second immediately previous frame of image) can be determined, and a matched feature point set of the second immediately previous frame of image corresponding to the object feature information of the tracked object can be obtained. Then, a state of the tracked object in this previous frame of image is calculated by using the matched feature point set of the point cloud information of the previous frame of image corresponding to the object feature information of the tracked object.

In addition, when the tracked object in the previous frame of image is in a static state, the pose of the tracked object can also be obtained by ICP calculation based on the point cloud information of the previous frame of image. When the tracked object is in a static state, point cloud information for the tracked object in the previous frame of image includes a sufficient amount of valid point cloud information to characterize the tracked object, such that a sufficient number of valid point clouds can be used in pose calculation, thereby improving pose calculation precision.

In this example, the tracked object in the previous frame of image is a static state, and the tracked object is continuously in a static state when image tracking processing is performed for the current frame of image, such that the point cloud information for the current frame of image can be obtained according to a plurality of frames of images corresponding to the tracked object in a static state. The point cloud information thus obtained is in a greater amount and is more precise. Further, the tracked object in a plurality of frames of images prior to the previous frame of image is also in a static state, thus further increasing the amount and precision of the point cloud information of the current frame of image.

In another example, the second matched feature point set of the previous frame of image can be determined based on the fact that the tracked object in the previous frame of image is in a dynamic state.

Specifically, when the tracked object in the previous frame of image is in a dynamic state, feature extraction can be performed on the previous frame of image, and extracted feature information is matched with the object feature information of the tracked object. When the number of matched feature points reaches a specified threshold, it can be determined that identification of the tracked object is successful, and then a pose is obtained using matched point pairs including the extracted feature information and object feature information. In this mode, after the pose is successfully calculated, the point cloud information of the previous frame of image can be matched with the object feature information, and the number of matched feature points is compared with a specified number threshold, and when the number of the matched feature points is greater than the specified number threshold, it can indicate that there is a sufficient amount of valid point cloud information in the point cloud information of the previous frame of image to characterize the tracked object.

After the first matched feature point set and the second matched feature point set of the previous frame of image are obtained, the first matched feature point set and the second matched feature point set are intersected, i.e., the feature points characterized in the first matched feature point set are compared with the feature points characterized in the second matched feature point set, and an intersection exists if a same feature point is found in the former and in the latter after the comparison. A higher number of intersections indicates that the tracked object in the current frame of image is closer to the tracked object in the previous frame of image, and a closer tracked object indicates a higher probability that the tracked object is in a static state.

Then, the number of intersections is compared with a first threshold. If the number of intersections is greater than the first threshold, it can be determined that the tracked object is in a static state. If the number of intersections is not greater than the first threshold, it can be determined that the tracked object is in a dynamic state.

In this example, when it is determined that the tracked object is in a static state, a pose of the tracked object in the current frame of image relative to the image capture device can be determined by using the first matched feature point set.

In the above example, the first matched feature point set obtained from the first point cloud information and the object feature information can characterize feature point pairs of the tracked object, and the second matched feature point set of the previous frame of image is compared with the first matched feature point set to determine whether the tracked object is in a static state. Moreover, the pose calculation operation is performed only in the static state, which ensures that a sufficient number of valid point clouds exist in the point cloud information used to perform the pose calculation, thus ensuring that a sufficient number of point clouds are available to calculate the pose, and improving the precision of the pose calculation.

In an example, a tracked object list can be set. The tracked object list is used to record tracked objects to be tracked in an image tracking process. The tracked objects in the tracked object list can be recorded in a user-defined manner, and can also be recorded when poses of tracked objects are determined for frames of images. When a tracked object whose pose is determined for a frame of image is not recorded in the tracked object list, the tracked object can be recorded in the tracked object list. For example, for a first frame of image, tracked objects are not yet recorded in the tracked object list at that time. After a pose of a tracked object A in the first frame of image is determined, the tracked object can be recorded in the tracked object list.

When a tracked object whose pose is determined for a frame of image is already recorded in the tracked object list, the tracked object whose pose is determined can be retained in the tracked object list. For example, when the tracked object list includes a tracked object A to be tracked recorded therein, when image tracking processing is performed for a frame of image, then a pose of the tracked object A in the frame of image can be determined, whereby the tracked object A can still be recorded in the tracked object list. When pose calculation fails for the tracked object A in the frame of image, the tracked object A can be removed from the tracked object list.

For each frame of image, when image tracking processing is performed on the frame of image, whether there is a tracked object in the tracked object list can be checked first, and then a pose of the tracked object can be determined in different ways according to whether there is the tracked object in the tracked object list.

Specifically, after a first matched feature point set of a tracked object in a current frame of image is determined, whether the tracked object is included in the tracked object list can be checked. When the tracked object is included in the tracked object list, a state of the tracked object can be determined according to the first matched feature point set and a second matched feature point set of the previous frame of image.

When the tracked object is not included in the tracked object list, the number of matched point pairs can be determined in the first matched feature point set. The matched point pairs in the first matched feature point set are matched point pairs consisting of matched first point cloud information and object feature information. It is also possible to determine the number of matched point pairs of feature information extracted from the current frame of image and object feature information. The matched point pairs include matched feature information and object feature information.

For the determined number of matched point pairs of any type described above, whether the determined number is greater than a specified number threshold can be determined. If the former is greater than the latter, the state of the tracked object can be determined according to determined matched point pairs. Specifically, in the case the determined matched point pairs are matched point pairs of the first matched feature point set, the state of the tracked object can be determined according to the matched point pairs of the first matched feature point set; and in the case the determined matched point pairs are matched point pairs of feature information and object feature information, the state of the tracked object can be determined according to the matched point pairs of feature information and object feature information. If it is determined that the determined number is not greater than the number threshold, it can be considered that the tracking for the tracked object fails. If the number of the matched point pairs in the first matched feature point set is not greater than the number threshold, it can indicate that the first point cloud information for the tracked object in the current frame of image includes few valid point clouds, resulting in that a pose cannot be calculated based on the limited number of valid point clouds or the precision of a calculated pose is not high. If the number of the matched point pairs of the extracted feature information and the object feature information is not greater than the number threshold, it can indicate that identification fails and thus the tracking operation cannot be continued.

In the above example, a tracked object being tracked currently can be shown through the set tracked object list, and for a tracked object recorded in the tracked object list, the operation of determining the state of the tracked object can be performed directly, thus simplifying the image tracking process and improving the processing efficiency of image tracking.

The operation of 440 described above is specifically illustrated below in conjunction with FIG. 6. FIG. 6 shows a flow diagram of an example 600 of a method for determining a pose according to extracted feature information and object feature information in an embodiment of the present disclosure.

The above-mentioned example 600 can be performed when a specified condition is met. The specified condition can be that a tracked object is in a dynamic state. In addition, the specified condition can include any of the conditions that a current frame of image is a first frame of image; there is no tracked object currently; and pose determination using a first point cloud information fails.

In this example, the first frame of image can be an image before which there is no frame of image previously, or where the tracked object is in a different state than the tracked object in previous consecutive frames of images. Image tracking processing for the first frame of image cannot be performed by referring to a pose of the tracked object in the previous frame of image. For example, the first frame of image can be the first image captured after an image capturing device is started, and can also be the first image captured for the tracked object that is in a continuously static state in the case the tracked object is in such a static state. In the case the current frame of image is a first frame of image, the operation of the example 600 can be performed on the current frame of image to determine the pose for the current frame of image.

That there is no tracked object currently can include a situation that the tracked object is lost or tracked object identification fails. The loss of the tracked object can include failure of pose calculation of the tracked object, loss of a pose calculation result of the tracked object, etc. In the case a tracked object list is set, whether a tracked object is recorded in the tracked object list can be checked. If no tracked object is recorded in the tracked object list, it can be determined that there is no tracked object currently.

Failure of pose determination using a first point cloud information can include a situation that pose calculation using a first point cloud information and object feature information is not successful, a large error occurs in a determined pose, or the like. In the case of failure of pose determination using a first point cloud information, the operation of the example 600 can be performed for the current frame of image to determine the pose, i.e., determining the pose according to extracted feature information. The amount of feature information extracted from an image is greater than the amount of the first point cloud information, and thus the probability of success in determining the pose using the greater amount of feature information increases accordingly.

As shown in FIG. 6, at 441, feature extraction can be performed on a current frame of image to obtain feature information of the current frame of image.

Then, at 443, the extracted feature information is matched with object feature information to obtain matched point pairs for the tracked object in the current frame of image.

In an example, the extracted feature information is matched with the object feature information, based on a pose of the tracked object in the previous frame of image to obtain matched point pairs of the tracked object.

Specifically, the pose of the tracked object in the previous frame of image (hereinafter referred to as an initial pose) can be acquired, and then the tracked object with the initial pose is projected, and feature points for the tracked object in the current frame of image are extracted according to the projected tracked object with the initial pose.

Specifically, for each pixel point of the tracked object with the initial pose, a feature point corresponding to the pixel point is matched in a specified area in the vicinity of the pixel point. The feature point corresponding to the pixel point is directed to a same location on the tracked object as the pixel point. For example, a feature point in the current frame of image corresponding to a pixel point directed to the tip of the nose of the tracked object in the previous frame of image is also directed to the tip of the nose of the tracked object. A specified area of a pixel point can be a surrounding area with the pixel point as the center. For example, the specified area can be a circular area with the pixel point as the center and 3 pixel points as the radius.

After feature points of the tracked object are determined from the current frame of image, feature information of the determined feature points can be acquired from the extracted feature information. At that point, the acquired feature information is only feature information of the feature points of the tracked object. Then, the acquired feature information is matched with the object feature information to obtain matched point pairs for the tracked object.

In the above example, since the tracked object does not move or moves at a small distance between two adjacent frames of images, a corresponding feature point can be found in a small specified area according to a pixel point of the tracked object in the previous frame of image, such that feature information matched with the object feature information only includes feature information of feature points of the tracked object, which reduces the amount of feature information to be matched and improves the matching efficiency.

In an example, the number of the obtained matched point pairs is compared with a specified number threshold. The number threshold can be used to assess whether identification of the tracked object is successfully. When the number of the matched point pairs is not greater than the number threshold. identification failure can be determined. When the number of the matched point pairs is greater than the number threshold. identification success for the tracked object can be determined. When the identification is successful, an operation of 445 below can be performed to determine the pose.

At 445, a pose of the tracked object in the current frame of image relative to an image capture device is determined according to the obtained matched point pairs.

In an example of the present disclosure, after the pose is determined, the determined pose can be checked by using a reprojection error. Specifically, the feature points of the tracked object are projected according to the determined pose to obtain corresponding position information, which is two-dimensional information, and then the obtained position information is compared with information of pixel points of the tracked object in the current frame of image. If an error from the comparison is within an allowed range, it can be determined that pose calculation for the tracked object is correct, otherwise it can be determined that the pose calculation for the tracked object is incorrect.

In this example, for each frame of image, after a pose is determined, it can be checked according to a reprojection error to improve the precision of the pose.

In an embodiment of the present disclosure, object feature information of objects to be tracked is stored in a preset offline feature database.

First, a tracked object to be tracked is determined, and object feature information of the tracked object is acquired from the offline feature database.

For a previous frame of image, when the previous frame of image satisfies at least one of the conditions that it is a first frame of image; there is no tracked object; pose determination using first point cloud information fails; and the tracked object is in a dynamic state, then feature extraction can be performed on the previous frame of image to extract feature information of the previous frame. Then, the extracted feature information is matched with object features of the tracked object to obtain matched point pairs of the tracked object. When the number of the matched point pairs is greater than a specified threshold, a pose of the tracked object in the previous frame of image can be determined according to the obtained matched point pairs.

Then, point cloud information of the previous frame of image is acquired, and the point cloud information of the previous frame of image is matched with the object features of the tracked object to obtain second matched feature point pairs. When the number of the second matched feature point pairs is greater than a threshold, the obtained second matched feature point pairs are used as a second matched feature point set for the previous frame of image.

Next, a following frame of image is acquired. For the following frame of image, first it can be determined whether the tracked object is included in a tracked object list. When the tracked object is included, point cloud information corresponding to the following frame of image is acquired, and a first matched feature point set of the tracked object in the following frame of image is determined according to the point cloud information corresponding to the following frame of image and the object feature information of the tracked object, and then feature points characterized in the first matched feature point set are compared with feature points characterized in the second matched feature point set. When the number of intersections obtained by the comparison is greater than a first threshold, it can be determined that the tracked object is in a static state. When the number of the intersections is not greater than the first threshold, it can be determined that the tracked object is in a dynamic state.

When the tracked object is in a static state, the pose of the tracked object in the current frame of image relative to the image capture device is determined by using the first matched feature point set. When the tracked object is in a dynamic state, feature extraction can be performed on the current frame of image, and extracted feature information can be matched with the object feature information to obtain matched point pairs for the tracked object, and the pose of the tracked object in the current frame of image relative to the image capture device can be determined according to the obtained matched point pairs.

Figure 7:
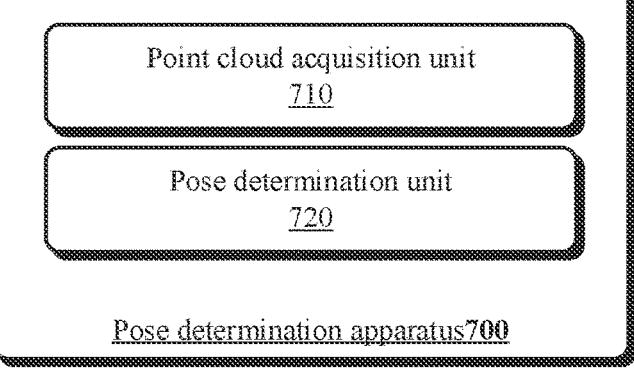
FIG. 7 shows a block diagram of an example of an apparatus for determining a pose of a tracked object in an image tracking process according to an embodiment of the present disclosure.

FIG. 7 shows a block diagram of an example of an apparatus (hereinafter referred to as a pose determination apparatus 700) for determining a pose of a tracked object in an image tracking process in an embodiment of the present disclosure.

As shown in FIG. 7, the pose determination apparatus 700 can include a point cloud acquisition unit 710 and a pose determination unit 720.

The point cloud acquisition unit 710 can be configured to acquire a current frame of image and first point cloud information corresponding to the current frame of image, wherein the first point cloud information is based on a relative relationship between an image capture device and an ambient space. For the operation of the point cloud acquisition unit 710, reference can be made to the operation of block 110 described above with reference to FIG. 1.

The pose determination unit 720 can be configured to determine a pose of the tracked object in the current frame of image relative to the image capture device, according to the first point cloud information and object feature information of the tracked object, when the tracked object is in a static state, wherein the object feature information is based on a relative relationship between the tracked object and the ambient space. For the pose determination unit 720. reference can be made to the operation of block 120 described above with reference to FIG. 1.

In an example, the pose determination apparatus 700 can also include a state determination unit. The state determination unit can be configured to determine a state of the tracked object according to the first point cloud information, the object feature information of the tracked object and point cloud information of the previous frame of image, the state including a static state and a dynamic state.

In an example, the state determination unit can be configured to: determine a first matched feature point set of the tracked object in the current frame of image according to the first point cloud information and the object feature information of the tracked object; and determine the state of the tracked object according to the first matched feature point set and a second matched feature point set of the previous frame of image, wherein the second matched feature point set includes second matched feature point pairs obtained according to the point cloud information of the previous frame of image and the object feature information. The pose determination unit can be configured to determine the pose of the tracked object in the current frame of image relative to the image capture device by using the first matched feature point set when the tracked object is in a static state. For the operation of the state determination unit, reference can be made to the operation of block 420 described above with reference to FIG. 4 and the operations of blocks 421 and 425 described above with reference to FIG. 5.

In an example, the pose determination apparatus 700 can further include a matched point pair determination unit. The matched point pair determination unit can be configured to determine the number of matched point pairs in the first matched feature point set, or determine the number of matched point pairs between feature information extracted from the current frame of image and the object feature information, when a tracked object list does not include the tracked object, wherein the tracked object list is used to record tracked objects to be tracked in the image tracking process. The state determination unit can further be configured to determine the state of the tracked object according to the determined matched point pairs when the determined number is greater than a number threshold; and determine the state of the tracked object according to the first matched feature point set and the second matched feature point set of the previous frame of image when the tracked object list includes the tracked object.

In an example, the pose determination apparatus 700 can further include a feature extraction unit and a feature matching unit. The feature extraction unit can be configured to perform feature extraction on the current frame of image if a specified condition is met. The feature matching unit can be configured to match extracted feature information with the object feature information to obtain matched point pairs for the tracked object. The pose determination unit can further be configured to determine the pose of the tracked object in the current frame of image relative to the image capture device according to the obtained matched point pairs. For the operation of the feature extraction unit, reference can be made to the operation of block 441 described above with reference to FIG. 6. For the operation of the feature matching unit, reference can be made to the operation of block 443 described above with reference to FIG. 6.

In an example, the pose determination unit can be configured to: when the number of the obtained matched point pairs is greater than a specified threshold, determine the pose of the tracked object in the current frame of image relative to the image capture device according to the obtained matched point pairs.

In an example, the feature matching unit can be configured to match the extracted feature information with the object feature information, based on a pose of the tracked object in the previous frame of image, to obtain the matched point pairs for the tracked object.

Embodiments of a method and apparatus for determining a pose of a tracked object in an image tracking process according to embodiments of the present disclosure are described above with reference to FIGS. 1 to 7.

The method and apparatus for determining a pose of a tracked object in an image tracking process can be implemented in hardware, and can also be implemented in software, or a combination of hardware and software. Using software implementation as an example, an apparatus in a logical sense is formed by reading, by a processor of a device where it is located, corresponding computer program instructions in a memory into an internal storage and running the same. In the present disclosure, the apparatus for determining a pose of a tracked object in an image tracking process can be implemented, for example, by using an electronic device.

Figure 8:
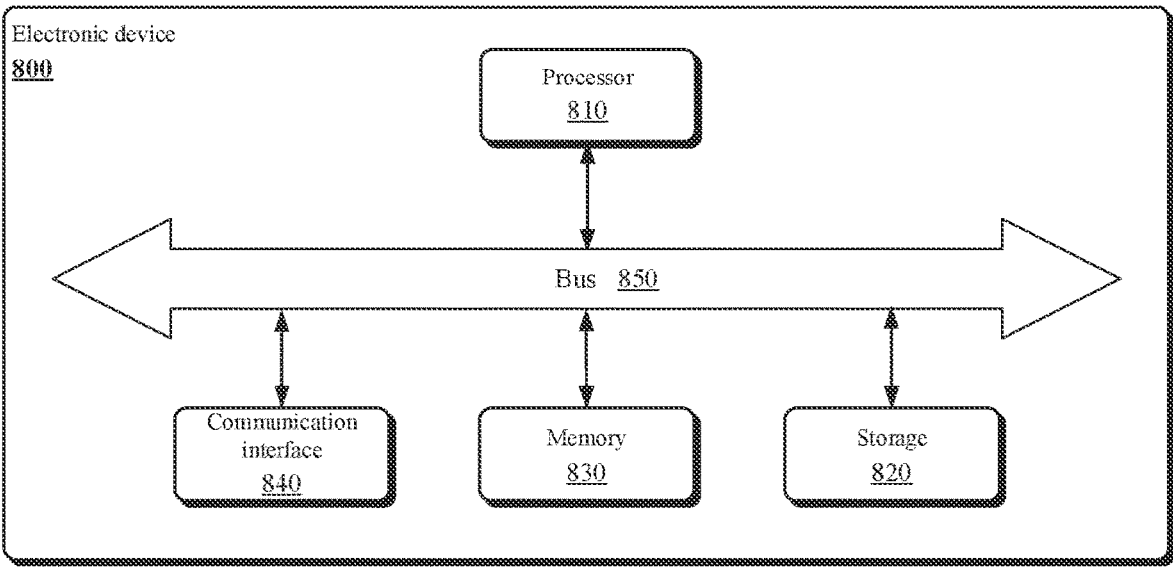
FIG. 8 shows a block diagram of an electronic device that implements a method for determining a pose of a tracked object in an image tracking process according to an embodiment of the present disclosure.

FIG. 8 shows a block diagram of an electronic device 800 that implements a method for determining a pose of a tracked object in an image tracking process in an embodiment of the present disclosure.

As shown in FIG. 8, the electronic device 800 can include at least one processor 810, a storage (such as a nonvolatile storage) 820, a memory 830, and a communication interface 840, and the at least one processor 810. the storage 820, the memory 830 and the communication interface 840 are connected together via a bus 850. The at least one processor 810 executes at least one computer readable instruction (i.e., an element implemented in software form as described above) stored or encoded in the memory.

In an embodiment, the memory stores computer-executable instructions which, when executed, cause the at least one processor 810 to: acquire a current frame of image and first point cloud information corresponding to the current frame of image. wherein the first point cloud information is based on a relative relationship between an image capture device and an ambient space: and determine a pose of the tracked object in the current frame of image relative to the image capture device, according to the first point cloud information and object feature information of the tracked object, when the tracked object is in a static state, wherein the object feature information is based on a relative relationship between the tracked object and the ambient space.

It should be understood that the computer-executable instructions stored in the memory, when executed, cause the at least one processor 810 to perform the various operations and functions described above in conjunction with FIGS. 1 to 7 in embodiments of the present disclosure.

According to an embodiment, a program product such as a machine-readable medium is provided. The machine-readable medium can have instructions (i.e., elements implemented in software form as described above) which, when executed by a machine, cause the machine to perform the various operations and functions described above in conjunction with FIGS. 1 to 7 in embodiments of the present disclosure.

Specifically, a system or apparatus with a readable storage medium can be provided, wherein software program codes implementing the functions of any of the above embodiments is stored on the readable storage medium, and a computer or processor of the system or apparatus is caused to read and execute the instructions stored in the readable storage medium.

In this case, the program codes read from the readable medium can itself implement the functions of any of the above embodiments, so the machine-readable codes and the readable storage medium storing the machine-readable code form part of the present invention.

Computer program codes required for operations in sections of the description can be written in any one or more programming languages, including object-oriented programming languages such as Java, Scala, Smalltalk, Eifel, JADE, Emerald, C++, C#, VB, NET, and Python, conventional procedural programming languages such as C language, Visual Basic 2003, Perl, COBOL 2002, PHP, and ABAP, dynamic programming languages such as Python, Ruby, and Groovy, or other programming languages. The program codes can be run on a user's computer, or run on a user's computer as an independent software package, or run partly on a user's computer and partly on a remote computer, or run entirely on a remote computer or server. In the latter case, the remote computer can be connected to a user's computer via any form of network, such as a local area network (LAN) or a wide area network (WAN), or connected to an external computer (e.g., via the Internet), or in a cloud computing environment, or used as a service, such as software as a service (SaaS).

Embodiments of the readable storage medium include a floppy disk, a hard disk, a magnetic optical disk, an optical disk (e.g., CD-ROM, CD-R, CD-RW, DVD-ROM, DVD-RAM, DVD-RW, and DVD-RW), a magnetic tape, a non-volatile memory card, and a ROM. Optionally, the program codes can be downloaded from a server computer or from a cloud via a communication network.

Particular embodiments of the description are described above. Other embodiments are within the scope of the appended claims. In some cases, actions or steps recited in the claims can be performed in a sequence different from that in the embodiments, and still can achieve an expected result. In addition, the processes depicted in the accompanying drawings do not necessarily require the shown particular sequence or successive sequence so as to achieve an expected result. In some implementations, multitasking and parallel processing are also possible or may be advantageous.

Not all of the steps and units in the above processes and system structural diagrams are necessary, and some steps or units can be omitted depending on actual needs. The order of execution of the steps is not fixed and can be determined as needed. The apparatus structures described in the above embodiments can be physical structures, and can also be logical structures, i.e., some units may be implemented by the same physical entity, or some units may be implemented respectively by a plurality of physical entities, or can be implemented jointly by some components of a plurality of independent devices.

The term "exemplary" used throughout the description means "used as an example, instance or illustration" and does not mean "preferred" or "advantageous" over other embodiments. For the purpose of providing understanding of the described technology, specific implementations include specific details. However, the technology can be implemented without the specific details. In some examples, to avoid making the concepts in the described embodiments difficult to understand, commonly known structures and apparatuses are shown in the form of block diagrams.

Optional implementations of embodiments of the present disclosure are described above in detail in conjunction with the accompanying drawings. However, the embodiments of the present disclosure are not limited to the specific details in the above implementations. Within the scope of the technical conception of the embodiments of the present disclosure, various simple variations can be made to the technical solutions of the embodiments of the present disclosure, and these simple variations are all encompassed within the protection scope of the embodiments of the present disclosure.

The foregoing description of the present disclosure is provided to enable any person of ordinary skill in the art to implement or use the present disclosure. Various modifications to the present disclosure are obvious to those of ordinary skill in the art, and the general principles defined herein can also be applied to other variations without departing from the scope of protection of the present disclosure. Thus, the present disclosure is not limited to the examples and designs described herein, but is consistent with the broadest scope conforming to the principles and novelty features of the present disclosure.

The invention claimed is:

1. A method for determining a pose of a tracked object in an image tracking process, comprising:

acquiring a current frame of image and first point cloud information corresponding to the current frame of image, wherein the first point cloud information is based on a relative relationship between an image capture device and an ambient space; and determining a pose of the tracked object in the current frame of image relative to the image capture device, according to the first point cloud information and object feature information of the tracked object, when the tracked object is in a static state, wherein the object feature information is based on a relative relationship between the tracked object and the ambient space;

performing feature extraction on the current frame of image when a specified condition is met;

matching extracted feature information with the object feature information to obtain matched point pairs for the tracked object; and determining the pose of the tracked object in the current frame of image relative to the image capture device according to the obtained matched point pairs, wherein the specified condition comprises any one of the following conditions:

the current frame of image is a first frame of image;

there is no tracked object currently;

pose determination using the first point cloud information fails; and the tracked object is in a dynamic state.

2. The method according to claim 1, further comprising:

determining a state of the tracked object according to the first point cloud information, the object feature information of the tracked object, and point cloud information of a previous frame of image, the state comprising a static state and a dynamic state.

3. The method according to claim 2, wherein determining a state of the tracked object according to the first point cloud information, the object feature information of the tracked object, and point cloud information of a previous frame of image comprises:

determining a first matched feature point set of the tracked object in the current frame of image according to the first point cloud information and the object feature information of the tracked object; and determining a state of the tracked object according to the first matched feature point set and a second matched feature point set of the previous frame of image, wherein the second matched feature point set comprises second matched feature point pairs obtained according to the point cloud information of the previous frame of image and the object feature information; and determining a pose of the tracked object in the current frame of image relative to the image capture device, according to the first point cloud information and the object feature information, when the tracked object is in a static state comprises:

determining the pose of the tracked object in the current frame of image relative to the image capture device, using the first matched feature point set, when the tracked object is in the static state.

4. The method according to claim 3, further comprising:

determining a number of matched point pairs in the first matched feature point set, or determining a number of matched point pairs between feature information extracted from the current frame of image and the object feature information, when a tracked object list does not comprise the tracked object, wherein the tracked object list is configured to record tracked objects to be tracked in the image tracking process; and determining the state of the tracked object according to the determined matched point pairs when the determined number is greater than a number threshold; and determining a state of the tracked object according to the first matched feature point set and a second matched feature point set of the previous frame of image comprises:

determining a state of the tracked object according to the first matched feature point set and the second matched feature point set of the previous frame of image when the tracked object list comprises the tracked object.

5. The method according to claim 4, wherein after determining the state of the tracked object according to the determined matched point pairs when the determined number is greater than a number threshold, the method further comprises recording the tracked object in the tracked object list.

6. The method according to claim 4, wherein after determining a state of the tracked object according to the first matched feature point set and the second matched feature point set of the previous frame of image when the tracked object list comprises the tracked object, the method further comprises intersecting the first matched feature point set and the second matched feature point set, in response to that a number of intersections is greater than the number threshold, determining that the tracked object is in a static state.

7. The method according to claim 3, wherein the second matched feature point set of the previous frame of image is determined based on the fact that the tracked object in the previous frame of image is in a static state.

8. The method according to claim 1, wherein the first point cloud information is obtained based on the current frame of image and historical frames of images corresponding to the static state.

9. The method according to claim 1, wherein point cloud information of each frame of image is extracted using a SLAM algorithm.

10. The method according to claim 1, wherein the first point cloud information comprises point cloud information for feature points in the current frame of image, the object feature information of a tracked object is pre-stored, the object feature information of the tracked object comprises pixel coordinates and descriptors in an image, for respective feature points of the tracked object, and the ambient space is used as a reference for both the pixel coordinates and descriptors in the object feature information.

11. The method according to claim 1, wherein determining the pose of the tracked object in the current frame of image relative to the image capture device according to the obtained matched point pairs comprises:

determining the pose of the tracked object in the current frame of image relative to the image capture device according to the obtained matched point pairs, when a number of the obtained matched point pairs is greater than a specified threshold.

12. The method according to claim 1, wherein matching extracted feature information with the object feature information to obtain matched point pairs for the tracked object comprises:

matching the extracted feature information with the object feature information, based on a pose of the tracked object in the previous frame of image, to obtain the matched point pairs for the tracked object.

13. The method according to claim 12, wherein matching the extracted feature information with the object feature information, based on a pose of the tracked object in a previous frame of image, to obtain the matched point pairs for the tracked object comprises:

acquiring an initial pose of the tracked object in the previous frame of image;

projecting the tracked object with the initial pose; and extracting feature points for the tracked object in the current frame of image according to a projected tracked object with the initial pose, wherein for each pixel point of the tracked object with the initial pose, a feature point corresponding to the pixel point is matched in a specified area in a vicinity of the pixel point.

14. An electronic device, comprising:

at least one processor; and a memory coupled with the at least one processor, the memory storing instruction which, when executed by the at least one processor, cause the at least one processor to execute a method for determining a pose of a tracked object in an image tracking process, the method comprising:

acquiring a current frame of image and first point cloud information corresponding to the current frame of image, wherein the first point cloud information is based on a relative relationship between an image capture device and an ambient space; and determining a pose of the tracked object in the current frame of image relative to the image capture device, according to the first point cloud information and object feature information of the tracked object, when the tracked object is in a static state, wherein the object feature information is based on a relative relationship between the tracked object and the ambient space;

performing feature extraction on the current frame of image when a specified condition is met;

matching extracted feature information with the object feature information to obtain matched point pairs for the tracked object; and determining the pose of the tracked object in the current frame of image relative to the image capture device according to the obtained matched point pairs, wherein the specified condition comprises any one of the following conditions:

the current frame of image is a first frame of image;

there is no tracked object currently;

pose determination using the first point cloud information fails; and the tracked object is in a dynamic state.

15. The electronic device according to claim 14, wherein the electronic device is an augmented reality device communicatively connected to a cell phone, the augmented reality device is configured to generate frames of images and send a generated current frame of image to the cell phone, the cell phone can perform data processing on the current frame of image to extract corresponding first point cloud information, and feed the first point cloud information to the augmented reality device.

16. A machine-readable non-transitory storage medium storing executable instructions which, when executed, cause a machine to execute a method for determining a pose of a tracked object in an image tracking process, the method comprising:

acquiring a current frame of image and first point cloud information corresponding to the current frame of image, wherein the first point cloud information is based on a relative relationship between an image capture device and an ambient space; and determining a pose of the tracked object in the current frame of image relative to the image capture device, according to the first point cloud information and object feature information of the tracked object, in response to that the tracked object is in a static state, wherein the object feature information is based on a relative relationship between the tracked object and the ambient space; and extracting feature on the current frame of image, matching extracted feature information with the object feature information to obtain matched point pairs for the tracked object, and determining a pose of the tracked object in the current frame of image relative to the image capture device according to the matched point pairs, in response to that the tracked object is in a dynamic state.

* * * * *